United States Patent
Ricard et al.

(10) Patent No.: US 11,765,397 B2
(45) Date of Patent: Sep. 19, 2023

(54) METHOD AND APPARATUS FOR ENCODING/DECODING THE COLORS OF A POINT CLOUD REPRESENTING A 3D OBJECT

(71) Applicant: InterDigital VC Holdings, Inc., Wilmington, DE (US)

(72) Inventors: Julien Ricard, Cesson-Sevigne (FR); Sebastien Lasserre, Cesson-Sevigne (FR); Celine Guede, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/754,028

(22) PCT Filed: Oct. 3, 2018

(86) PCT No.: PCT/US2018/054133
§ 371 (c)(1),
(2) Date: Apr. 6, 2020

(87) PCT Pub. No.: WO2019/070830
PCT Pub. Date: Apr. 11, 2019

(65) Prior Publication Data
US 2020/0296427 A1    Sep. 17, 2020

(30) Foreign Application Priority Data

Oct. 6, 2017    (EP) .................................. 17306342

(51) Int. Cl.
*H04N 19/96*    (2014.01)
*H04N 19/147*   (2014.01)
(Continued)

(52) U.S. Cl.
CPC ............... *H04N 19/96* (2014.11); *G06T 9/40* (2013.01); *H04N 19/147* (2014.11); *H04N 19/186* (2014.11)

(58) Field of Classification Search
CPC .... H04N 19/96; H04N 19/147; H04N 19/186; G06T 9/40
See application file for complete search history.

(56) References Cited

U.S. PATENT DOCUMENTS

| 8,179,393 B2 | 5/2012 | Minear et al. |
| 2003/0214502 A1* | 11/2003 | Park ..................... G06T 17/005 345/420 |

(Continued)

FOREIGN PATENT DOCUMENTS

| CN | 105808672 A | 7/2016 |
| CN | 106973569 A | 7/2017 |

(Continued)

OTHER PUBLICATIONS

Cesar, Pablo; Mekuria, Rufel; "MP3DG-PCC, Open Source Software Framework for Implementation and Evaluation of Point Cloud Compression"; Oct. 2016; Proceedings of the 24th ACM ICoM Oct. 2016 pp. 1222-1226, obtained from https://dl.acm.org/doi/abs/10.1145/2964284 (Year: 2016).*

(Continued)

*Primary Examiner* — Jeremiah C Hallenbeck-Huber
(74) *Attorney, Agent, or Firm* — Condo Roccia Koptiw LLP

(57) ABSTRACT

The present principles a method and a device for encoding the colors of a point cloud (IPC) representing a 3D object. The method is characterized in that the method comprises: —obtaining (210) a set of points (SP) approximating the geometry of said point cloud (IPC); —encoding (220) a color information data indicating that the color of at least one of the point of said set of points is encoded in a bitstream (Continued)

and that the colors of the other points of said set of points are not encoded in the bitstream. The present principles also relates to a method and a device for decoding the colors of a point cloud.

20 Claims, 8 Drawing Sheets

(51) Int. Cl.
*H04N 19/186* (2014.01)
*G06T 9/40* (2006.01)

(56) References Cited

U.S. PATENT DOCUMENTS

| | | | | |
|---|---|---|---|---|
| 2011/0202538 | A1* | 8/2011 | Salemann | G06F 16/29 707/741 |
| 2013/0321418 | A1* | 12/2013 | Kirk | H04N 13/239 345/426 |
| 2015/0103073 | A1* | 4/2015 | Tian | G06T 17/005 345/419 |
| 2015/0145861 | A1* | 5/2015 | Tytgat | G06T 17/00 345/420 |
| 2015/0279085 | A1* | 10/2015 | Dell | G06T 11/006 345/419 |
| 2016/0058288 | A1* | 3/2016 | DeBernardis | A61B 5/0075 600/477 |
| 2016/0086353 | A1* | 3/2016 | Lukac | G06T 9/00 345/419 |
| 2017/0039759 | A1* | 2/2017 | Huet | B33Y 50/02 |
| 2018/0075622 | A1* | 3/2018 | Tuffreau | G06T 9/001 |

FOREIGN PATENT DOCUMENTS

| | | |
|---|---|---|
| EP | 1431919 A1 | 6/2004 |
| WO | WO 2015172227 A1 | 11/2015 |
| WO | WO 2017126314 A1 | 7/2017 |

OTHER PUBLICATIONS

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

Huang et al., "A Generic Scheme for Progressive Point Cloud Coding", IEEE Transactions on Visualization and Computer Graphics, vol. 14, No. 2, Mar.-Apr. 2008, pp. 440-453.

Ainala et al., "An Improved Enhancement Layer for Octree Based Point Cloud Compression with Plane Projection Approximation", 2016 SPIE Applications of Digital Image Processing XXXIX, vol. 9971, Sep. 27, 2016, 9 pages.

Schnabel et al., "Octree-based Point-Cloud Compression", Symposium on Point Based Graphics, Boston, Massachusetts, USA, Jan. 2006, pp. 111-121.

Lasserre, S., "What is point cloud compression ?", Point Cloud Compression Presentation to the Video Groups, International Organization on Standardization, ISO/IEC JTC1/SC29/WG11, Coding of Moving Pictures and Audio, ISO/IEC JTC1/SC29/WG11 MPEG2017/m40715, Hobart, Australia, Apr. 2017, 20 pages.

Ainala et al., "Point Cloud Geometry Compression with Plane Projection Approximation", International Organization on Standardization, ISO/IEC JTC 1/SC 29/WG 11, Coding of Moving Pictures and Audio, ISO/IEC JTC 1/SC 29/WG 11 m39435, Chengdu, China, Oct. 2016, 4 pages.

Song et al., "Progressive Compression and Transmission of Point-Texture Images", Journal of Visual Communication & Image Representation, vol. 17, No. 5, Oct. 1, 2006, pp. 1090-1107.

Cui et al., "Hybrid Color Attribute Compression for Point Cloud Data", IEEE International Conference on Multimedia and Expo (ICME 2017), Hong Kong, China, Jul. 10, 2017, pp. 1273-1278.

Ahn et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 422-434.

Ochotta, et al., "Image-Based Surface Compression", Computer Graphics Forum; vol. 27 (2008), 6-S., Sep. 2008, pp. 1647-1663.

* cited by examiner

METHOD AND APPARATUS FOR ENCODING/DECODING THE COLORS OF A POINT CLOUD REPRESENTING A 3D OBJECT

This application is the National Stage Entry under 5 U.S.C. § 371 of Patent Cooperation Treaty Application No. PCT/US2018/054133, filed Oct. 3, 2018, which was published in accordance with PCT Article 21(2) on Apr. 11, 2019, in English, and which claims the benefit of European Patent Application No. 17306342.1, filed Oct. 6, 2017.

FIELD

The present principles generally relate to coding and decoding the colors of a point cloud representing a 3D object. Particularly, but not exclusively, the technical field of the present principles are related to octree-based encoding/decoding of point cloud.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair, fur that may not be represented efficiently by other data format like meshes. Each point of a point cloud is often defined by a 3D spatial location (X, Y, and Z coordinates in the 3D space) and possibly by other associated attributes such as color, represented in the RGB or YUV color space for example, a transparency, a reflectance, a two-component normal vector, etc.

A colored point cloud may be a set of 6-components points (X, Y, Z, G, B) or equivalently (X, Y, Z, Y, U, V) where (X,Y,Z) defines the spatial location of a point in a 3D space and (R,G,B) or (Y,U,V) defines a color of this point.

In the following the term "point cloud" refers to any point cloud including a colored point cloud.

Colored point clouds may be static or dynamic depending on whether or not the cloud evolves with respect to time. It should be noticed that in case of a dynamic point cloud; the number of points is not constant but, on the contrary, generally evolves with time. A dynamic point cloud is thus a time-ordered list of sets of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance; a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decision based on the reality of their immediate neighboring. Typical sensors produce dynamic point clouds that are used by the decision engine. These point clouds are not intended to be viewed by a human being. They are typically small, not necessarily colored, and dynamic with a high frequency of capture. They may have other attributes like the reflectance that is a valuable information correlated to the material of the physical surface of sensed object and may help the decision.

Virtual Reality (VR) and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point clouds are a good format candidate to distribute VR worlds. They may be static or dynamic and are typically of averaged size, say no more than a few millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience. Similarly to video compression, a good use of temporal correlation is thought to be the crucial element that will lead to efficient compression of dynamic point clouds.

Well-known approaches project a colored point cloud representing the geometry and colors of a 3D object, onto the faces of a cube encompassing the 3D object to obtain videos on texture and depth, and code the texture and depth videos using a legacy encoder such as 3D-HEVC (an extension of HEVC whose specification is found at the ITU website, T recommendation, H series, h265, http://www.itu.int/rec/T-REC-H.265-201612-I/en annex G and I).

Performance of compression is close to video compression for each projected point, but some contents may be more complex because of occlusions, redundancy and temporal stability when dynamic point clouds are considered. Consequently, point cloud compression is more demanding than video compression in term of bit-rates.

Regarding occlusions, it is virtually impossible to get the full geometry of a complex topology without using many projections. The required resources (computing power, storage memory) for encoding/decoding all these projections are thus usually too high.

Octree-based encoding is also a well-known approach for encoding the geometry of a point cloud. An octree-based structure is obtained for representing the geometry of the point cloud by splitting recursively a cube encompassing the point cloud until the leaf cubes, associated with the leaf nodes of said octree-based structure, contain no more than one point of the point cloud. The spatial locations of the leaf cubes of the octree-based structure thus represent the spatial locations of the points of the point cloud, i.e. its geometry.

Encoding colors of the points in the leaf cubes requires very high bitrate especially when the geometry of the point cloud is complex because it requires a lot of leaf cubes.

Therefore, there is a trade-off to be found between obtaining a good representation of the geometry of a point cloud without requiring a high bitrate for encoding the colors of said point cloud.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

Generally speaking, the present principles relates to a method for encoding the colors of a point cloud representing a 3D object. The method comprises obtaining a set of points approximating the geometry of said point cloud, and encoding a color information data indicating that the color of at least one of the point of said set of points is encoded in a bitstream and that the colors of the other points of said set of points are not encoded in the bitstream.

In that way, at the decoding side, the colors of the points that define the geometry of the decoded point cloud are obtained either by decoding the bitstream or from the colors of already colorized decoded points, and thus according to said decoded color information data.

This leads to significant reduction of the bitrate required for encoding the colors of the points approximating the colors of the point cloud.

According to an embodiment, at least one point of the set of points is a point in a leaf cube associated with a leaf node of an octree-based structure approximating the geometry of the point cloud.

According to an embodiment, said octree-based structure is determined by optimizing a trade-off between a bit-rate for encoding a candidate octree-based structure approximating the points of the point cloud, and a distortion taking into account spatial distances between, on one hand, said points of the point cloud, and on the other hand, points which are included in leaf cubes associated with leaf nodes of the candidate octree-based structure and which approximate the points of the point cloud.

According to an embodiment, at least one point of the set of points is an up-sampled point obtained by up-sampling recursively the points associated with said octree-based structure.

According to an embodiment, at least one point of the set of points is a point of an inverse-projected point cloud.

According to an embodiment, the inverse-projected point cloud IPPC by inverse-projecting at least one texture and depth images representative of a part of the point cloud.

According to another of their aspects, the present principles relate to a method for decoding, from a bitstream, the colors of a point cloud representing a 3D object. The method comprises:
  obtaining, from the bitstream, a set of points approximating the geometry of said point cloud;
  decoding a color information data from the bitstream;
  for each point of the set of points,
    when the color information data (indicates that the color of a point is encoded in the bitstream, decoding the color of the point from the bitstream; and
    otherwise, obtaining the color of the point from the colors of neighboring points.

According to an embodiment, at least one point of the set of points is a point in a leaf cube associated with a leaf node of an octree-based structure approximating the geometry of the point cloud.

According to an embodiment, at least one point of the set of points is an up-sampled point obtained by up-sampling recursively the points associated with said octree-based structure.

According to an embodiment, at least one point of the set of points is a point of an inverse-projected point cloud.

According to an embodiment, when the color of an up-sampled point is not encoded in the bitstream, the color of said up-sampled point is obtained from the color of at least one point in a leaf cube of the octree-based structure located around the up-sampled point.

According to an embodiment, when the color of an up-sampled point is not encoded in the bitstream, the color of said up-sampled point is obtained from the color of at least one points in leaf cubes around the up-sampled point, and the color of at least one points of said inverse-projected point cloud.

According to another of their aspects, the present principles relate to a signal carrying on data representative of a set of points approximating the geometry of a point cloud. The signal also carries a color information data indicating that the color of at least one of the point of said set of points is also carried by the signal and that the colors of the other points of said set of points are not carried by the signal.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated. It shows.

Similar or same elements are referenced with the same reference numbers.

DESCRIPTION OF EXAMPLE OF THE PRESENT PRINCIPLES

Figure 1:
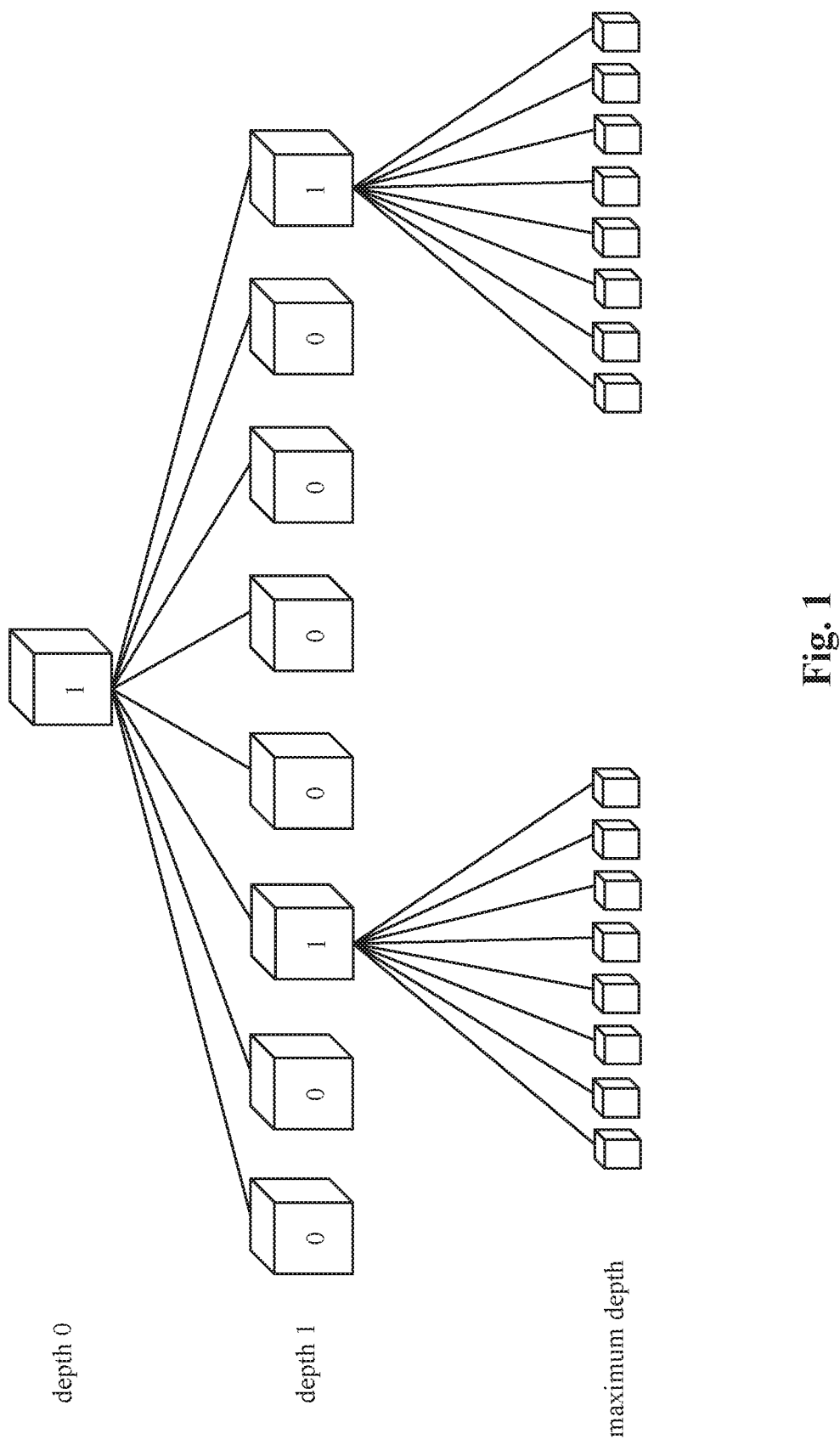
FIG. 1 illustrates an example of an octree-based structure.

The present principles will be described more fully hereinafter with reference to the accompanying figures, in which examples of the present principles are shown. The present principles may; however; be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding the colors of a point cloud but extends to the encoding/decoding of the colors of a sequence of point clouds because each point cloud of the sequence is sequentially encoded/decoded as described below.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of nv values, where nv is the number of components. Each value of a vector is represented with a number of bits which defines a maximal dynamic range of the pixel values.

A depth image is an image whose pixel values depths of 3D points. Usually, a depth image is a grey levels image.

An octree-based structure comprises a root node, at least one leaf node and possibly intermediate nodes. A leaf node is a node of the octree-based structure which has no child. All other nodes have children. Each node of an octree-based structure is associated with a cube. Thus, an octree-based structure comprises a set of at least one cube associated with node(s).

A leaf cube is a cube associated with a leaf node of an octree-based structure.

In the example illustrated on FIG. 1, the cube associated with the root node (depth 0) is split into 8 sub-cubes (depth 1) and two sub-cubes of depth 1 are then split into 8 sub-cubes (last depth=maximum depth=2).

Figure 2:
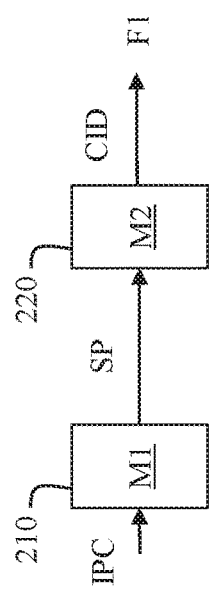
FIG. 2 shows schematically a diagram of the steps of the method for encoding the colors of a point cloud representing a 3D object in accordance with an example of the present principles.

FIG. 2 shows schematically a diagram of the steps of the method for encoding the colors of a point cloud IPC representing a 3D object in accordance with an example of the present principles.

In step 210, a module M1 obtains a set of points SP approximating the geometry of said point cloud IPC.

In step 220, a module M2 encodes a color information data CID indicating that the color of at least one of the point of said set of points SP is encoded in a bitstream and that the colors of the other points of said set of points are not encoded in the bitstream.

According to an embodiment of steps 210, at least one point of the set of points SP is a point $P_i$ in a leaf cube associated with a leaf node of an octree-based structure O approximating the geometry of the point cloud IPC.

Figure 3:
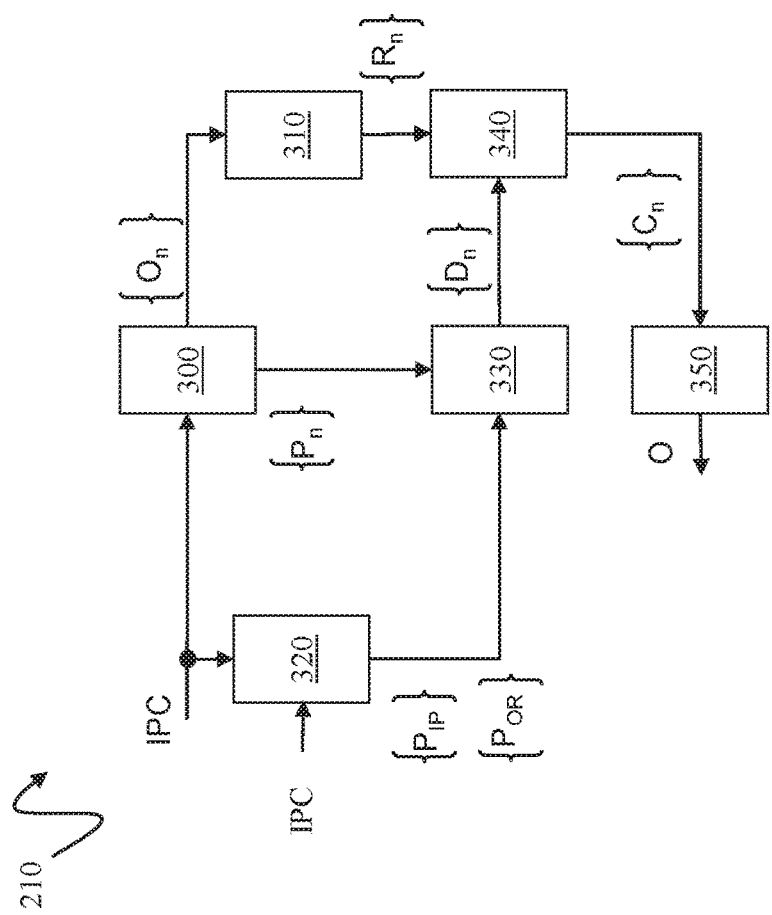
FIG. 3 shows the diagram of the sub-steps of the step 210 in accordance with an embodiment of the present principles.

FIG. 3 shows the diagram of the sub-steps of the step 210 in accordance with an embodiment of the present principles.

According to this embodiment, a Rate Distortion optimization (RDO) process is used to determine a best octree-based structure O for approximating the geometry of the point cloud IPC. The points P in leaf cubes associated with leaf nodes of said octree-based structure O approximate the points of the point cloud IPC, i.e. the geometry of the point cloud IPC.

A RDO process finds a best octree-based structure O from N candidate octree-based structures $O_n$ (n∈[1; N]). The basic principle is to test successively each candidate octree-based structure $O_n$ and for each candidate octree-based structure $O_n$ to calculate a Lagrangian cost $C_n$ given by:

$$C_n = D_n + \lambda R_n \quad (1)$$

where $R_n$ and $D_n$ are respectively the bit-rate and distortion detailed below, and λ is a fixed Lagrange parameter that may be fixed for all the candidate octree-based structures $O_n$.

The best octree-based structure O is then obtained by optimizing a trade-off between the bit-rate $R_n$ for encoding a candidate octree-based structure $O_n$ approximating the points $P_{or}$ of the point cloud, i.e. by minimizing the Lagrangian cost $C_n$:

$$O = \underset{O_n}{\mathrm{argmin}} C_n(O_n) \quad (2)$$

High values for the Lagrangian parameter strongly penalize the bit-rate $R_n$ and lead to a low quality of approximation, while low values for the Lagrangian parameter allow easily high values for $R_n$ and lead to high quality of approximation. The range of values for lambda depends on the distortion metric and most importantly the distance between two adjacent points. Assuming that this distance is unity, typical values for lambda are in the range from a few hundreds, for very poor coding, to a tenth of unity for good coding. These values are indicative and may also depend on the content.

Determining a best octree-based structure O is now detailed in accordance with an embodiment of the present principles.

In step 300, the module M1 obtains a set of N candidate octree-based structures $O_n$ and obtains a set of points $P_n$ for each candidate octree-based structure $O_n$. The points $P_n$ are points which are included in leaf cubes associated with leaf nodes of a candidate octree-based structure $O_n$. The points $P_n$ approximate the points of the point cloud IPC.

In step 310, the module M1 obtains the bit-rate $R_n$ for encoding each candidate octree-based structure $O_n$.

In step 320, the module M1 obtains the points $P_{or}$ of the point cloud IPC.

In step 330, the module M1 obtains a distortion $D_n$ for each candidate octree-based structure $O_n$, each distortion $D_n$ takes into account the spatial distances between, on one hand, the points $P_{or}$, and on the other hand, the points $P_n$.

In step 340, the module M1 calculates the Lagrangian cost $C_n$ according to equation (1) for each candidate octree-based structure $O_n$.

In step 350, the module M1 obtains the best octree-based structure O according to equation (2) once all the candidate octree-based structures $O_n$ have been considered.

According to an embodiment of step 300, a candidate octree-based structure $O_n$ comprises at least one leaf node and the leaf cube associated to a leaf node may (or not) include a single point $P_n$.

Each single point is a point $P_i$ of the best octree-based structure O is a point of the set of points SP.

Figure 4:
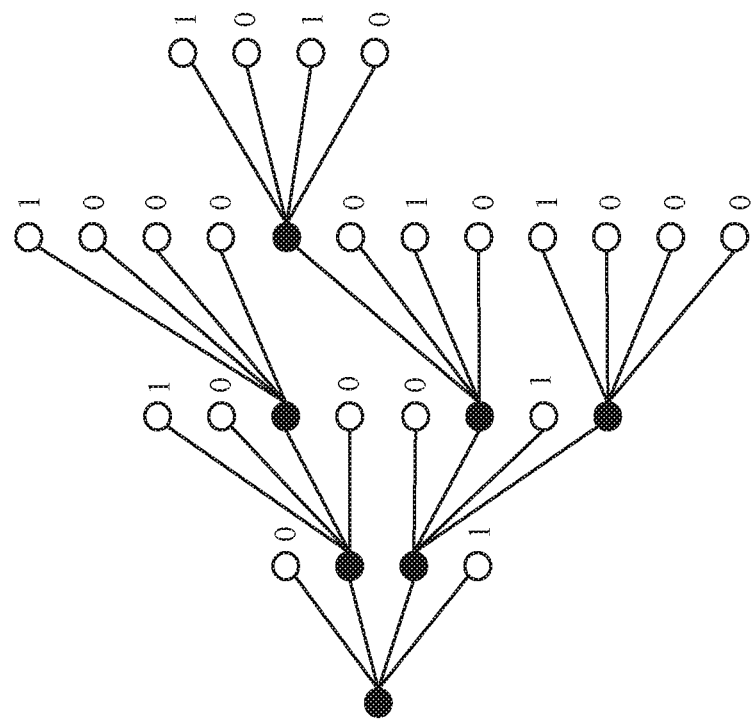
FIG. 4 shows an illustration of an example of a candidate octree-based structure.
Figure 4:
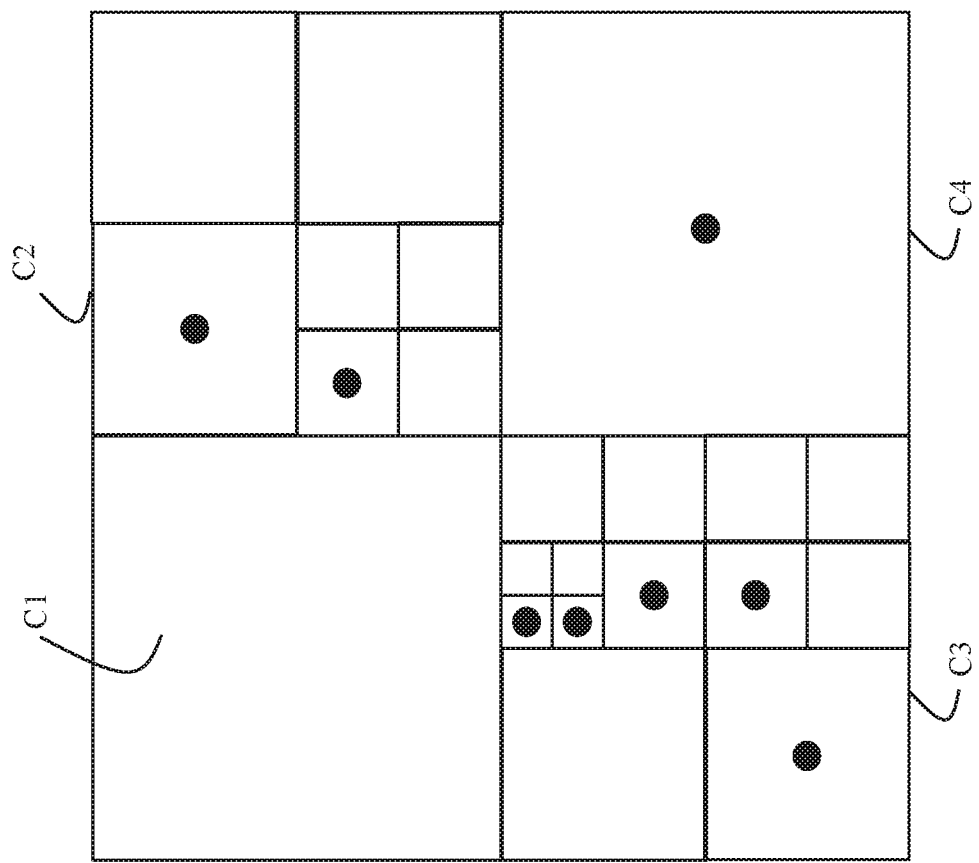

FIG. 4 shows an illustration of an example of a candidate octree-based structure $O_n$ according to this embodiment. This figure represents an example of a quadtree-based structure that splits a square, but the reader will easily extend it to the 3D case by replacing the square by a cube.

According to this example, the cube is split into 4 sub-cubes C1, C2 C3 and C4 (depth 1). The sub-cube C1 is associated with a leaf node and does not contain any point. The sub-cube C2 is recursively split into 4 sub-cubes (depth 2). The sub-cube C3 is also recursively split and the sub-cube C4 is not split but a point, located in the center of the cube for example, is associated with it, . . . , etc.

On the right part of FIG. 4 is shown an illustration of the candidate octree-based structure. A black circle indicates that a node is split. A binary flag is associated with each white circle (leaf node) to indicate if the square (a cube in the 3D case) includes (1) or not (0) a point.

According to this example, a point is located in the center of a cube because it avoids any additional information about the spatial location of that point once the cube is identified in the octree-based structure. But the present principles are not limited to this example and may extend to any other spatial location of a point in a cube.

The present principles are not limited to the candidate octree-based structure illustrated on FIG. 4 but extend to any other octree-based structure comprising at least one leaf node whose associated leaf cube includes at least one point. These points are thus the points of the set of points SP.

According to an embodiment of step 330, the distortion $D_n$ is a metric given by:

$$D_n = d(P_n, P_{OR}) + d(P_{OR}, P_n)$$

where d(A,B) is a metric that measures the spatial distance from a set of points A to a set of points B. This metric is not symmetric, this means that distance from A to B differs from the distance from B to A.

The distance $d(P_n, P_{OR})$ ensures that the points included $P_n$ in leaf cubes associated with leaf nodes of a candidate octree-based structure $O_n$ are not too far from the point cloud IPC, avoiding coding irrelevant points.

The distance $d(P_{OR}, P_n)$ ensures that each point of the point cloud IPC is approximated by points not too far from them, i.e. ensures that all parts of the point cloud IPC are well approximated.

According to an embodiment of step 330, the distance d(A,B) is given by:

$$d(A, B) = \sum_{p \in A} \| p - q_{closest}(p, B) \|_2^2$$

where the norm is the Euclidan distance and $q_{closest}(p,B)$ is the closest point of B from a point p of A defined as $$q_{closest}(p, B) = \underset{q \in B}{\mathrm{argmin}} \| p - q \|_2^2.$$

According to an embodiment of the step 340, a candidate octree-based structure $O_n$ is encoded by a set of binary flags. Some of these binary flags are associated with the nodes of said candidate octree-based structure $O_n$ to indicate if the cubes associated with said nodes are split or not, and some other of these binary flags are associated with leaf nodes of said candidate octree-based structure $O_n$ to indicate if the leaf cubes associated with leaf nodes of said candidate octree-based structure $O_n$ includes or not points representative of at least a part of the point cloud IPC. The bit-rate $R_n$ for encoding said candidate octree-based structure $O_n$ is then the sum of the numbers of these binary flags.

According to a variant, at least one first sequence of bits is formed from said binary flags and said at least one sequence of bits is entropy-coded. The bit-rate $R_n$ is then obtained from the entropy-encoded version of said at least one sequence of bits.

According to an alternative to this embodiment of the step 340, the syntax used to encode a candidate octree-based structure $O_n$ may comprise an index of a table (Look-Up-Table) that identifies a candidate octree-based structure among a set of candidate octree-based structures determined beforehand, for example by an end-user. This table of candidate octree-based structures is known at the decoder. A set of bits (one or more bytes) are used for encoding said index of a table. The bit-rate $R_n$ is thus the bit-rate required for encoding said index.

The geometry of the octree-based structure O may be encoded by a set of binary flags. Some of these binary flags are associated with the nodes of said octree-based structure O to indicate if the cubes associated with said nodes are split or not, and some other of these binary flags are associated with leaf nodes of said octree-based structure O to indicate if the leaf cubes associated with leaf nodes of said octree-based structure O includes or not points representative of at least a part of the point cloud IPC.

According to a variant, at least one first sequence of bits is formed from said binary flags and said at least one sequence of bits is entropy-coded.

According to an alternative, the syntax used to encode said octree-based structure O may comprise an index of a table (Look-Up-Table) that identifies a candidate octree-based structure among a set of candidate octree-based structures determined beforehand, for example by an end-user. This table of candidate octree-based structures is known at the decoder. A set of bits (one or more bytes) are used for encoding said index of a table. The bit-rate $R_n$ is thus the bit-rate required for encoding said index.

When the color of a point $P_i$ in a leaf cube of said octree-based structure O is encoded in the bitstream F1, said color may be encoded by at least one byte, typically three bytes, one per color component.

According to a variant of an embodiment of step 210, at least one point of the set of points SP is an up-sampled point $P_{up}$ obtained by up-sampling recursively the points $P_i$ associated with the octree-based structure O.

Figure 5:
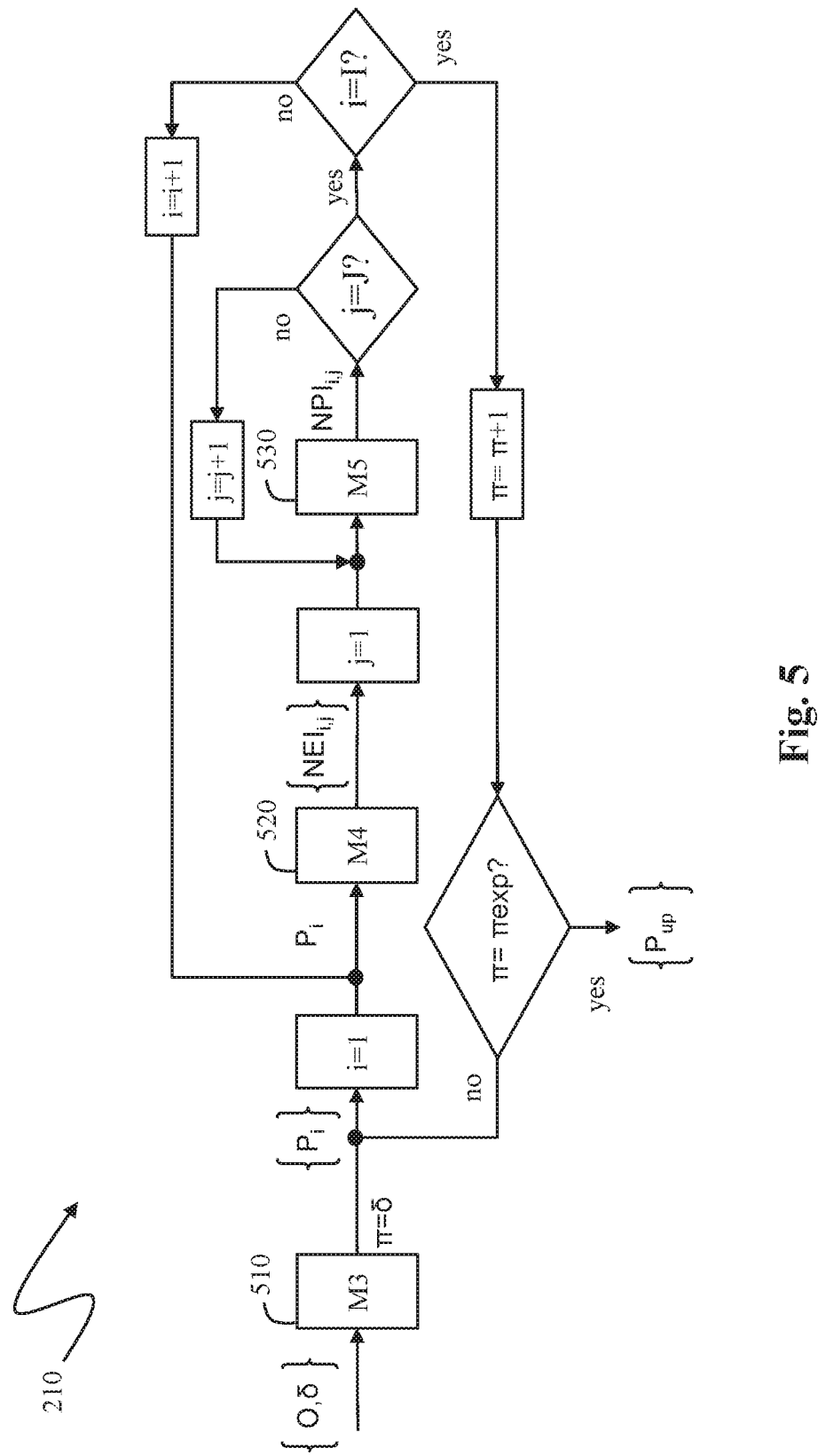
FIG. 5 shows schematically a diagram of the steps of the method for up-sampling recursively the points $P_i$ associated with the octree-based structure O with a maximum depth level $\delta$ in accordance with an embodiment of step 210.

FIG. 5 shows schematically a diagram of the steps of the method for up-sampling recursively the points $P_i$ associated with the octree-based structure O with a maximum depth level δ in accordance with an embodiment of step 210.

In step 510, a module M3 obtains a set of I point $P_i$ (I is greater than or equals 1) from the octree-based structure O. Each of said points $P_i$ is located at the center of a leaf cube $C_i$ itself associated with a leaf node $N_i$ at the maximum depth level δ. Assuming that all cubes of a same depth have a same size, the points $P_i$ are positioned on a regular 3D grid of step the size of the cube of maximum depth level δ. The points $P_i$ of this grid are said to be of precision level $\pi=\delta$.

Some of the leaf nodes may be located at a depth level lower than the maximum depth level.

According to a variant of step 510, the octree-based structure O is said completed by splitting recursively the leaf cubes associated with said leaf nodes at depth levels lower than the maximum depth level until their depth levels reach the maximum depth level. At each iteration, four child nodes are added to the octree-based structure with a point $P_i$ preferably located in its center.

The purpose of the up-sampling process is to up-sample said points $P_i$ up to a precision level πexp that is the precision level associated with a regular 3D grid of step the size of cubes of maximum depth level δexp=πexp. Typically, the maximum depth level δexp would be associated with leaf cubes of unitary size, i.e. the minimum size of a "3D pixel" (=a small cube) in the rendering process of the point cloud.

At each iteration, the set of I points $P_i$ is considered.

In step 520, a point $P_i$ is considered. A module M4 determines if a neighbor (on the regular 3D grid) point $NEI_{i,j}$ is located in a neighborhood of the point $P_i$, and, for each of the J neighbor points $NEI_{i,j}$, in step 530, a module M5 determines a new point $NP_{i,j}$. The new point $NP_{i,j}$ is located at the middle of a segment joining the point $P_i$ and the neighbor point $NEI_{i,j}$.

The new points $NP_{i,j}$ are added to the set of points $P_i$ and the new set of points $P_i$ is considered for the next iteration. The points of the new set of points $P_i$ are located on a new regular 3D grid of step half the step of the regular grid on which the points of the old set of points $P_i$ are located. In other words, the precision level of the grid has been increased by 1 during the steps 520 and 530.

The iterations stop when the precision level π of the points $P_i$ reaches the expected precision level πexp, at each iteration the precision level π being increased by 1.

The output of FIG. 5 is the set of points $P_i$ obtained after the last iteration, this last set being referred as up-sampled points $P_{up}$.

Figure 6B:
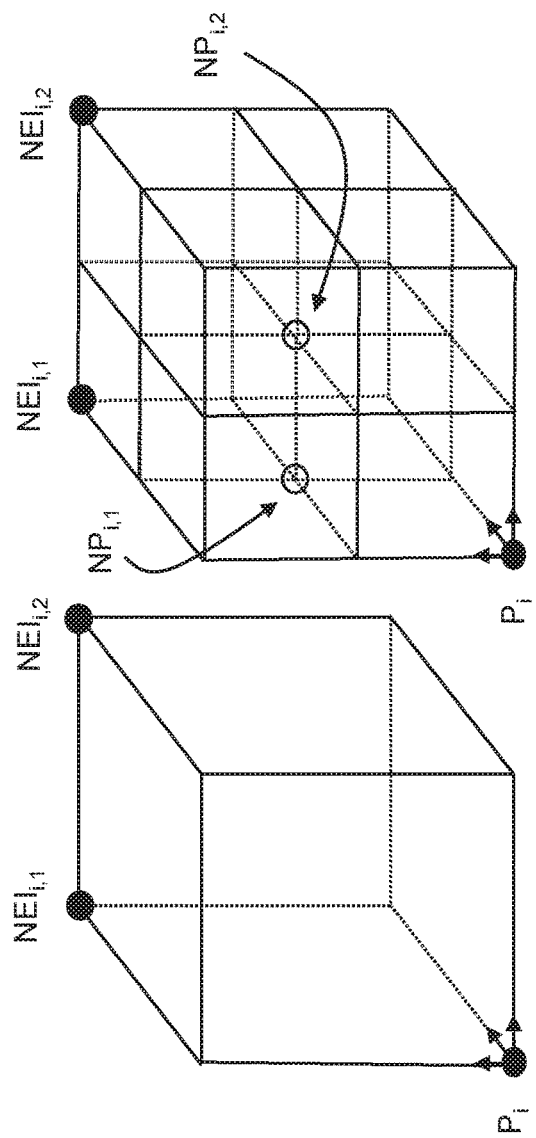
FIGS. 6a-b illustrate the up-sampling in accordance with an example of the present principles.
Figure 6A:
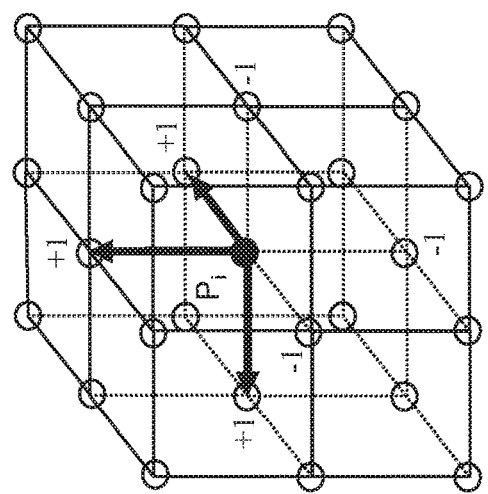

FIGS. 6a-b illustrate the determination of neighbor points $NEI_{i,j}$ and new point $NP_{i,j}$ in steps 520 and 530.

In FIG. 6a, is represented all possible neighboring points (white circles) of a point $P_i$ (black point). The regular 3D grid represented on the figure is of precision level π as the precision level of the grid of the point $P_i$ is π.

The neighborhood of this point $P_i$ is defined, according to an embodiment, by adding the values +S, 0 or −S to at least one of the coordinates of the point $P_i$, where S is the step of the regular 3D grid of precision level π. S=1 for the example illustrated on FIG. 6a. Then, the point $P_i$ may have at most 26 neighbor points represented by circles.

In FIG. 6b, is represented an example wherein the point $P_i$ has two neighbor points $NEI_{i,1}$ and $NEI_{i,2}$. A new point $NP_{i,1}$ is added at the middle of a segment defined by the points $P_i$ and $NEI_{i,1}$, and a new point $NP_{i,2}$ is added at the middle of a segment defined by the points $P_i$ and $NEI_{i,2}$. The new grid illustrated on FIG. 6b (right) is of precision level π+1, i.e. has a step half the step of the grid of precision level π illustrated on FIG. 6b (left).

The present principles are not limited to this example but may extend to any other method for defining a neighborhood of the point $P_i$ and to any other method for defining a new point from two existing points located in a neighborhood of the point $P_i$.

Determining if a neighbor point $NEI_{i,j}$ is located in a neighborhood of the point $P_i$ as described above leads to many couples of points to be tested as illustrated in FIG. 6a.

Figure 7:
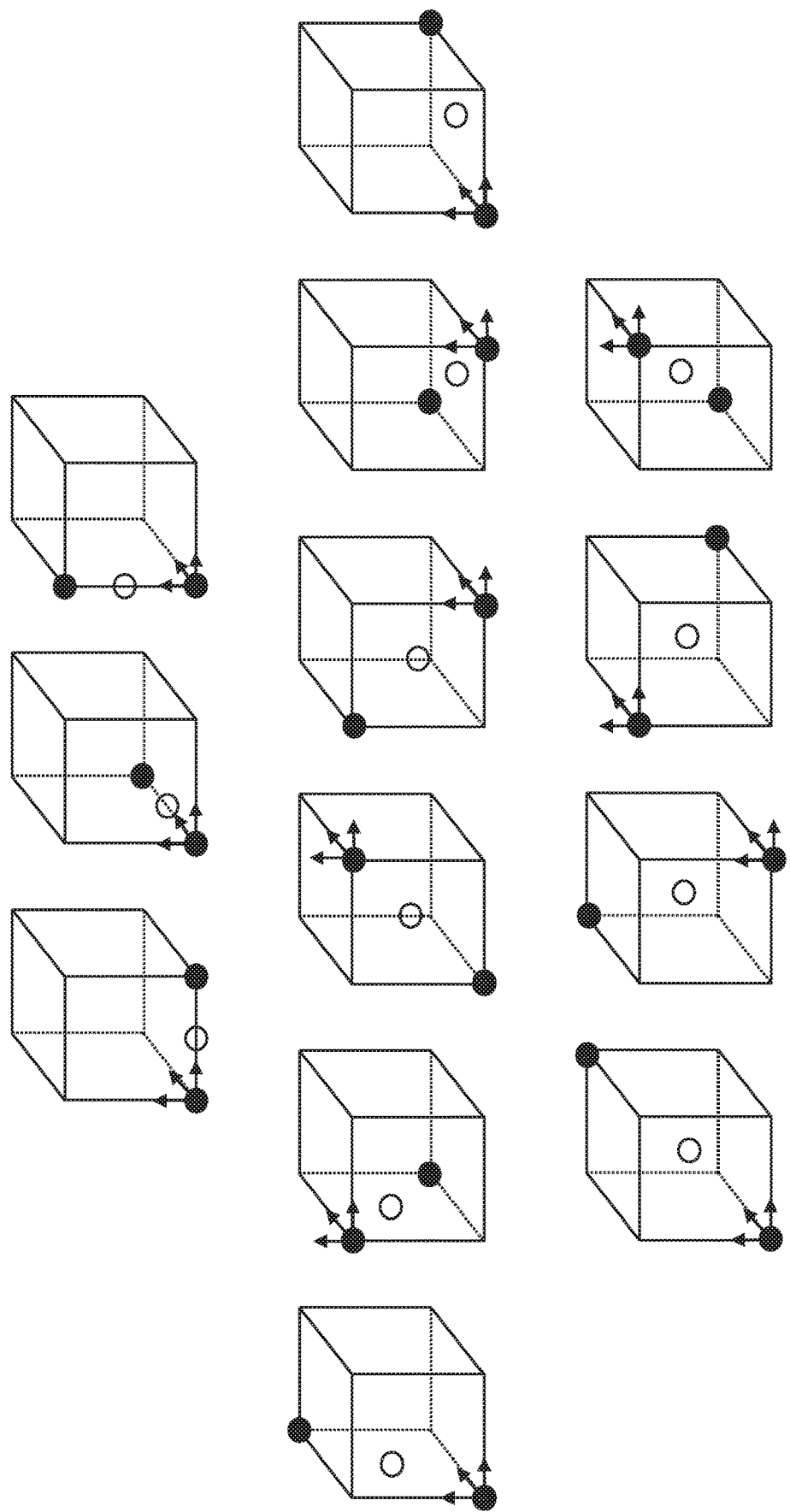
FIG. 7 illustrates a variant of the method of FIG. 5 in accordance with an example of the present principles.

This number of 26 couples of points to be tested may be reduced to 13 according to a variant illustrated in FIG. 7 where 3 of said 13 couples of points consider neighbor points along segment starting from the point $P_i$, 6 of said 13 couples of points consider neighbor points along small diagonal starting from the point $P_i$, and 4 of said 13 couples of points consider the neighbor points along all long diagonal starting from the point $P_i$.

Said variant avoids thus to check twice the same couple of points, thus the number of 26/2=13 couples to be checked in step 520.

According to an embodiment of step 210, at least one point of the set of points SP is a point $P_{IP}$ of an inverse-projected point cloud IIPC.

According to an embodiment of step 210, the module M1 obtains points $P_{IP}$ of the inverse-projected point cloud IPPC by inverse-projecting at least one texture and depth images representative of the point cloud IPC, as proposed, for example, in "Image-Based Surface Compression", Tilo Ochutta & Dietmar Saupe, September 2008, in Computer Graphics Forum.

Basically, the point cloud IPC is projected on texture images which represent the color of the points of the point cloud IPC and on depth images which represent the distances between the planes of the texture images and the points of the point cloud IPC. Thus, a point $P_{IP}$ in the 3D space may be obtained from pixel of the texture images and its associated depth obtained from a depth image, and the set of points $P_{IP}$ form the inverse-projected point cloud IIPC. Said inverse-projected point cloud IIPC is thus an approximation of both the geometry and colors of the points of the point cloud IPC and the colors of the point cloud IPC are encoded by encoding the texture images.

According to an embodiment of step 220, the color information data CID is defined in order to signal that:
 the colors of the points $P_i$ are encoded in the bitstream F1;
 the colors of the points $P_{IP}$ are also encoded in the bitstream F1; and
 the color of at least one up-sampled point $P_{up}$ is not encoded in the bitstream.

This embodiment is advantageous because it allows a precise approximation of the geometry of the point cloud IPC by up-sampling the points $P_i$ associated with the octree-based structure O without requiring a high bitrate for encoding the up-sampled points, which are retrieved at the decoding side from the octree-based structure O, and for encoding the colors of said up-sampled points which are obtained from the colors of previously decoded points.

According to a variant of step 220, the color information data CID indicate if the colors of a sub-set of points of the set of points SP are encoded in the bitstream F1.

According to an embodiment, the points of the sub-set points may be points spatially close to each other and having a similar color. Euclidean distance may be used for estimating the spatial distance between two points and a difference between the colors of points may be compared to a threshold to decide the similarity between two colors.

This embodiment is advantageous for large region with similar colors because only a single color for multiple points and the color information data CID has to be encoded, reducing thus the global bitrate for encoding the colors of the point cloud.

According to an embodiment of step 220, the color information data CID comprises at least a binary flag equals to 1 to indicate that the color of a point of the set of points SP is encoded in the bitstream and 0 otherwise.

According to an embodiment of step 220, the color information data CID comprises at least one binary flag equals to 1 to indicate that the colors of a sub-set of points of the set of points SP are encoded in the bitstream and 0 otherwise.

Figure 8:
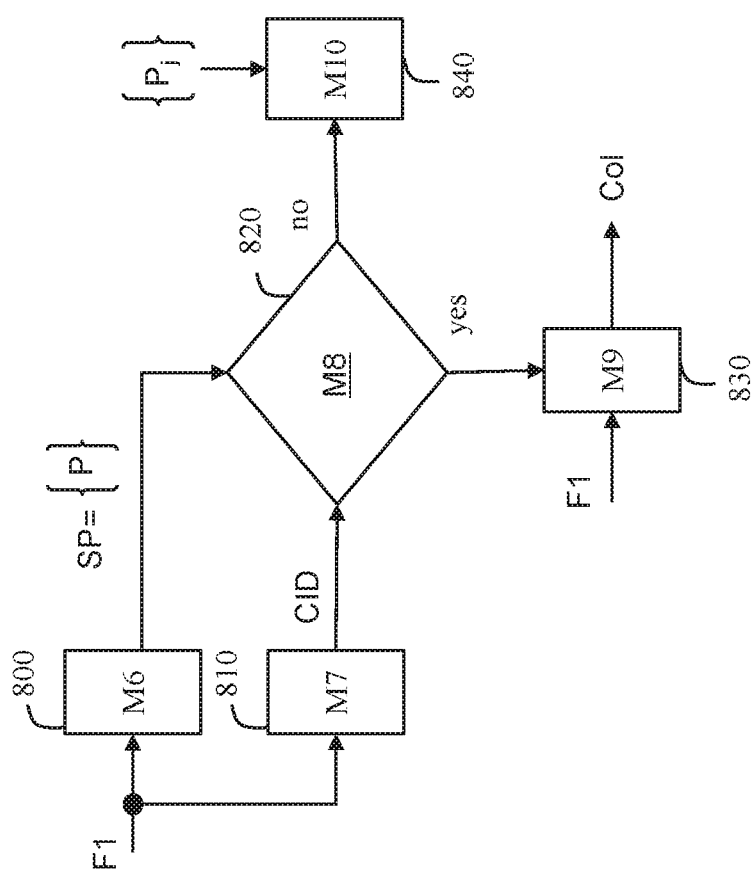
FIG. 8 shows schematically a diagram of the steps of the method for decoding, from a bitstream, the colors of a point cloud representing a 3D object in accordance with an example of the present principles.

FIG. 8 shows schematically a diagram of the steps of the method for decoding, from a bitstream, the colors of a point cloud IPC representing a 3D object in accordance with an example of the present principles.

In step 800, a module M6 obtains a set of points SP from the bitstream F1. This set of points SP approximates the geometry of the point cloud IPC. According to an embodiment of step 800, at least one point of the set of points SP is a point $P_i$ in a leaf cube associated with a leaf node of an octree-based structure O approximating the geometry of the point cloud IPC.

In this case, the module M6 decodes the octree-based structure O from the bitstream F1.

According to an embodiment of the step 800, the octree-based structure O is decoded from a set of binary flags. Some of these binary flags indicate if cubes associated with nodes of said octree-based structure O are split or not, and some other of these binary flags indicate if the leaf cubes associated with leaf nodes of said octree-based structure O includes or not points representative of at least a part of the point cloud IPC.

The octree-based structure O is then built and a point $P_i$ is or not included in each leaf cube according to some of those binary flags.

According to a variant, at least one first sequence of bits is entropy-decoded and said binary flags are obtained from said at least one decoded sequence.

According to an alternative, the syntax used to decode the octree-based structure O may comprise an index of a table (Look-Up-Table) that identifies a candidate octree-based structure among a set of candidate octree-based structures determined beforehand, for example by an end-user. This table of candidate octree-based structures is known at the decoder. The module M6 decodes a set of bit(s) and determined said index of a table from said decoded set of bit(s).

When the color of a point $P_i$ is decoded in the bitstream F1, said color may be decoded from at least one byte, typically three bytes, one per color component.

According to an embodiment of step 800, at least one point of the set of points SP is an up-sampled point $P_{up}$ obtained by up-sampling recursively the points $P_i$ associated with the octree-based structure O as detailed in FIGS. 5-7.

According to an embodiment of step 800, at least one point of the set of points SP is a point $P_{IP}$ of an inverse-projected point cloud IIPC. The module M6 decodes at least one texture and depth image representative of the point cloud IPC from the bitstream F1 and obtained said inverse-projected point cloud IIPC by inverse-projecting said at least one decoded texture and depth images as explained above in relation with an embodiment of step 210.

In step 810, a module M7 decodes a color information data CID from the bitstream F1.

In step 820, for each point P of the set of points SP, a module M8 determines if the color information data CID indicates if the color of a point P is encoded in the bitstream F1.

If the color of a point P is encoded in the bitstream F1, in step 830, a module M9 decodes the color Col of the point P from the bitstream F1.

Otherwise, in step 840, a module M10 obtains the color of the point P from the colors of neighboring points $P_j$.

According to an embodiment, the color of the point P is obtained by the average or the median value of the colors of the neighboring points $P_j$.

According to an embodiment of step 840, a neighboring point $P_j$ of a point P is a point spatially close to the point P according to an Euclidean distance.

According to an embodiment of step 840, when the color of an up-sampled point $P_{up}$ is not encoded in the bitstream F1, the color of said up-sampled point $P_{up}$ is obtained from the color of at least one point $P_i$ in a leaf cubes of the octree-based structure O located around the up-sampled point $P_{up}$.

For example, a point $P_i$ is considered as being located around an up-sampled point if an Euclidean distance between the points $P_i$ and $P_{up}$ is lower than a threshold.

In a variant, the color of said up-sampled point $P_{up}$ is obtained from the color of at least one points $P_i$ in leaf cubes around the up-sampled point $P_{up}$, and the color of at least one inverse-projected point $P_{IP}$.

On FIG. 1-8, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 9:
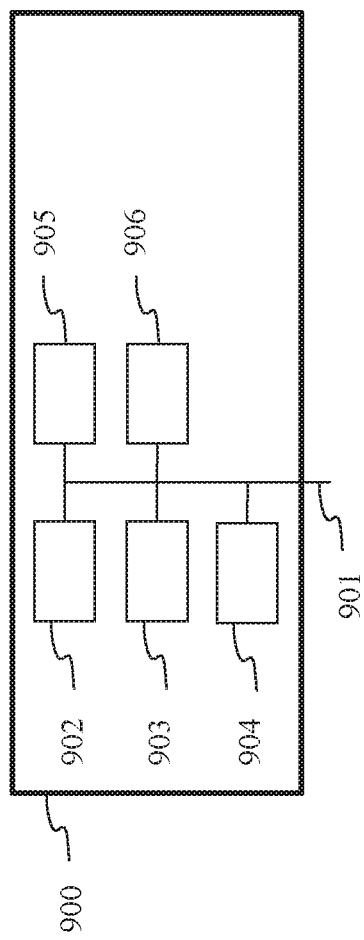
FIG. 9 shows an example of an architecture of a device in accordance with an example of present principles.

FIG. 9 represents an exemplary architecture of a device 900 which may be configured to implement a method described in relation with FIG. 1-8.

Device 900 comprises following elements that are linked together by a data and address bus 901:
- a microprocessor 902 (or CPU), which is, for example, a DSP (or Digital Signal Processor);
- a ROM (or Read Only Memory) 903;
- a RAM (or Random Access Memory) 904;
- an I/O interface 905 for reception of data to transmit, from an application; and
- a battery 906.

In accordance with an example, the battery 906 is external to the device. In each of mentioned memory, the word «register» used in the specification can correspond to area of small capacity (some bits) or to very large area (e.g. a whole program or large amount of received or decoded data). The ROM 903 comprises at least a program and parameters. The ROM 903 may store algorithms and instructions to perform techniques in accordance with present principles. When switched on, the CPU 902 uploads the program in the RAM and executes the corresponding instructions.

RAM 904 comprises, in a register, the program executed by the CPU 902 and uploaded after switch on of the device 900, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the point cloud IPC is obtained from a source. For example, the source belongs to a set comprising:
- a local memory (903 or 904), e.g. a video memory or a RAM (or Random Access Memory), a flash memory, a ROM (or Read Only Memory), a hard disk;
- a storage interface (905), e.g. an interface with a mass storage, a RAM, a flash memory, a ROM, an optical disc or a magnetic support;
- a communication interface (905), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded point cloud is sent to a destination; specifically, the destination belongs to a set comprising:
- a local memory (903 or 904), e.g. a video memory or a RAM, a flash memory, a hard disk;
- a storage interface (905), e.g. an interface with a mass storage, a RAM, a flash memory, a ROM, an optical disc or a magnetic support;
- a communication interface (905), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface);
- a rendering device; and
- a display.

In accordance with examples of encoding or encoder, the bitstream F1 is sent to a destination. As an example, the bitstream F1 is stored in a local or remote memory, e.g. a video memory (904) or a RAM (904), a hard disk (903). In a variant, the bitstream F1 is sent to a storage interface (905), e.g. an interface with a mass storage, a flash memory, ROM, an optical disc or a magnetic support and/or transmitted over a communication interface (905), e.g. an interface to a point to point link; a communication bus, a point to multipoint link or a broadcast network.

In accordance with examples of decoding or decoder, the bitstream F1 is obtained from a source. Exemplarily, a bitstream is read from a local memory, e.g. a video memory (904), a RAM (904), a ROM (903), a flash memory (903) or a hard disk (903). In a variant, the bitstream is received from a storage interface (905), e.g. an interface with a mass storage, a RAM, a ROM, a flash memory, an optical disc or a magnetic support and/or received from a communication interface (905), e.g. an interface to a point to point link, a bus, a point to multipoint link or a broadcast network.

In accordance with examples, device 900 being configured to implement an encoding method described in relation with FIG. 1-7, belongs to a set comprising:
- a mobile device;
- a smartphone or a TV set with 3D capture capability
- a communication device;
- a game device;
- a tablet (or tablet computer);
- a laptop;
- a still image camera;
- a video camera;
- an encoding chip;

a still image server; and
a video server (e.g. a broadcast server, a video-on-demand server or a web server).

In accordance with examples, device 900 being configured to implement a decoding method described in relation with FIG. 5-8, belongs to a set comprising:
a mobile device;
a Head Mounted Display (HMD)
(mixed reality) smartglasses
an holographic device
a communication device;
a game device;
a set top box;
a TV set;
a tablet (or tablet computer);
a laptop;
a display
a sterescopic display and
a decoding chip.

Figure 10:
FIG. 10 shows two remote devices communicating over a communication network in accordance with an example of present principles.

According to an example of the present principles, illustrated in FIG. 10, in a transmission context between two remote devices A and B over a communication network NET, the device A comprises a processor in relation with memory RAM and ROM which are configured to implement a method for encoding a colored point cloud as described in relation with the FIGS. 1-7 and the device B comprises a processor in relation with memory RAM and ROM which are configured to implement a method for decoding as described in relation with FIGS. 5-8.

In accordance with an example, the network is a broadcast network, adapted to broadcast encoded colored point clouds from device A to decoding devices including the device B.

A signal, intended to be transmitted by the device A, carries the bitstream F1.

This signal may thus carry on data representative of a set of points approximating the geometry of a point cloud, characterized in that it also carries a color information data (CID) indicating that the color of at least one of the point of said set of points is also carried by the signal and that the colors of the other points of said set of points are not carried by the signal.

Figure 11:
FIG. 11 shows the syntax of a signal in accordance with an example of present principles.

FIG. 11 shows an example of the syntax of such a signal when the data are transmitted over a packet-based transmission protocol. Each transmitted packet P comprises a header H and a payload PAYLOAD.

According to embodiments, the payload PAYLOAD may comprise at least one of the following elements:
a color information data (CID) indicating that the color of at least one of the point of said set of points is also carried by the signal and that the colors of the other points of said set of points are not carried by the signal.

Implementations of the various processes and features described herein may be embodied in a variety of different equipment or applications.

Examples of such equipment include an encoder, a decoder, a post-processor processing output from a decoder, a pre-processor providing input to an encoder, a video coder; a video decoder, a video codec, a web server, a set-top box, a laptop, a personal computer, a cell phone, a PDA, a HMD, smart glasses, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:

obtaining an octree-based structure approximating a geometry of a point cloud, wherein the octree-based structure defines a set of points associated with the point cloud and comprises a leaf cube including a single point, the set of points corresponding to a representation of the point cloud at a first precision level;

adding at least one new point to the set of points defined by the octree-based structure, wherein the at least one new point is obtained by up-sampling recursively the single point, the at least one new point increasing the representation of the point cloud to a second precision level;

determining a color of the at least one new point based on a color of another point located around the at least one new point, wherein the other point is determined to be located around the at least one new point based on a determination that a distance between the other point and the at least one new point is below a threshold value; and encoding color information indicating that a color of the single point is encoded in a bitstream and that the color of the at least one new point is not encoded in the bitstream.

2. The method of claim 1, wherein the octree-based structure is determined by optimizing a trade-off between a bit-rate for encoding a candidate octree-based structure approximating points of the point cloud, and a distortion taking into account spatial distances between the points of the point cloud and points that are included in leaf cubes associated with leaf nodes of the candidate octree-based structure and approximate the points of the point cloud.

3. The method of claim 1, further comprising obtaining at least one point of an inverse-projected point cloud.

4. The method of claim 3, wherein a color of the at least one point of the inverse-projected point cloud is encoded in the bitstream and the color information also indicates that the color of the at least one point of the inverse-projected point cloud is encoded in the bitstream.

5. The method of claim 3, wherein the inverse-projected point cloud is obtained by inverse-projecting at least one texture and depth images representative of a part of the point cloud.

6. A non-transitory computer readable medium comprising instructions which, when executed by a computing device, cause the computing device to carry out the method of claim 1.

7. A method comprising:

obtaining, based on a bitstream, an octree-based structure approximating a geometry of a point cloud, wherein the octree-based structure defines a set of points associated with the point cloud and includes a leaf cube comprising a single point, the set of points corresponding to a representation of the point cloud at a first precision level;

adding at least one new point to the set of points defined by the octree-based structure, wherein the at least one new point is obtained by up-sampling recursively the single point, the at least one new point increasing the representation of the point cloud to a second precision level;

decoding color information included in the bitstream, wherein the color information indicates that a color of the single point is encoded in the bitstream and that a color of the at least one new point is not encoded in the bitstream; and obtaining the color of the at least one new point from a color of another point located around the at least one new point, wherein the other point is determined to be located around the at least one new point based on a determination that a distance between the other point and the at least one new point is below a threshold value.

8. The method of claim 7, further comprising obtaining at least one point of an inverse-projected point cloud from the bitstream.

9. The method of claim 8, wherein when the color information also indicates that a color of the at least one point of the inverse-projected point cloud is encoded in the bitstream, the method further comprises obtaining the color of the at least one point of the inverse-projected point cloud from the bitstream.

10. The method of claim 8, wherein the color of the at least one new point is obtained from the color of the other point located around the at least one new point and a color of the at least one point of the inverse-projected point cloud.

11. A non-transitory computer readable medium comprising instructions which, when executed by a computing device, cause the computing device to carry out the method of claim 7.

12. A device, comprising electronic circuitry configured to:

obtain an octree-based structure approximating a geometry of a point cloud, wherein the octree-based structure defines a set of points associated with the point cloud and comprises a leaf cube including a single point, the set of points corresponding to a representation of the point cloud at a first precision level;

add at least one new point to the set of points defined by the octree-based structure, wherein the at least one new point is obtained by up-sampling recursively the single point, the at least one new point increasing the representation of the point cloud to a second precision level;

determine a color of the at least one new point based on a color of another point located around the at least one new point, wherein the other point is determined to be located around the at least one new point based on a determination that a distance between the other point and the at least one new point is below a threshold value; and encode color information indicating that a color of the single point is encoded in a bitstream and that the color of the at least one new point is not encoded in the bitstream.

13. The device of claim 12, wherein the octree-based structure is determined by optimizing a trade-off between a bit-rate for encoding a candidate octree-based structure approximating points of the point cloud, and a distortion taking into account spatial distances between the points of the point cloud and points which are included in leaf cubes associated with leaf nodes of the candidate octree-based structure and which approximate the points of the point cloud.

14. The device of claim 12, wherein the electronic circuitry is further configured to obtain at least one point of an inverse-projected point cloud.

15. The device of claim 14, wherein a color of the at least one point of the inverse-projected point cloud is encoded in the bitstream and the color information also indicates that the color of said at least one point of the inverse-projected point cloud is encoded in the bitstream.

16. The device of claim 14, wherein the inverse-projected point cloud is obtained by inverse-projecting at least one texture and depth images representative of a part of the point cloud.

17. A device comprising electronic circuitry configured to:
- obtain, based on a bitstream, an octree-based structure approximating a geometry of a point cloud, wherein the octree-based structure defines a set of points associated with the point cloud and includes a leaf cube comprising a single point, the set of points corresponding to a representation of the point cloud at a first precision level;
- add at least one new point to the set of points defined by the octree-based structure, wherein the at least one new point is obtained by up-sampling recursively the single point, the at least one new point increasing the representation of the point cloud to a second precision level;
- decode color information from the bitstream, wherein the color information indicates that a color of the single point is encoded in the bitstream and that the color of the at least one new point is not encoded in the bitstream; and
- obtain the color of the at least one new point from a color of another point located around the at least one new point, wherein the other point is determined to be located around the at least one new point based on a determination that a distance between the other point and the at least one new point is below a threshold value.

18. The device of claim 17, wherein the electronic circuitry is further configured to obtain at least one point of an inverse-projected point cloud from the bitstream.

19. The device of claim 18, wherein when the color information also indicates that a color of the at least one point of the inverse-projected point cloud is encoded in the bitstream, the electronic circuitry is further configured to obtain the color of the at least one point of the inverse-projected point cloud from the bitstream.

20. The device of claim 18, wherein the color of the at least one new point is obtained from the color of the other point located around the at least one new point and a color of the at least one point of the inverse-projected point cloud.

\* \* \* \* \*